(12) United States Patent
Bazer-Bachi et al.

(10) Patent No.: US 8,686,170 B2
(45) Date of Patent: Apr. 1, 2014

(54) METHOD OF PREPARING ALCOHOL ESTERS FROM TRIGLYCERIDES AND ALCOHOLS USING HETEROGENEOUS CATALYSTS BASED ON NITROGEN-CONTAINING METALLOPHOSPHATES

(75) Inventors: Delphine Bazer-Bachi, Saint-Genis-Laval (FR); Francois Chevire, Rennes (FR); Vincent Lecocq, Orlienas (FR); Erwan Ray, Rennes (FR); Pascal Raybaud, Lyons (FR); Franck Tessier, Chantepie (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 237 days.

(21) Appl. No.: 13/150,765

(22) Filed: Jun. 1, 2011

(65) Prior Publication Data
US 2012/0004433 A1 Jan. 5, 2012

(30) Foreign Application Priority Data

Jun. 2, 2010 (FR) .................................... 10 02327

(51) Int. Cl.
*C11C 3/00* (2006.01)
(52) U.S. Cl.
USPC ........................ 554/169; 554/167; 554/163
(58) Field of Classification Search
None
See application file for complete search history.

(56) References Cited

U.S. PATENT DOCUMENTS

| 5,908,946 A | 6/1999 | Stern et al. |
| 7,592,470 B2 | 9/2009 | Lacome et al. |
| 2005/0266139 A1 | 12/2005 | Lacome et al. |

FOREIGN PATENT DOCUMENTS

| FR | 2 667 856 A1 | 4/1992 |
| FR | 2 752 242 A1 | 2/1998 |
| FR | 2 855 517 A1 | 12/2004 |

OTHER PUBLICATIONS

FR2667856 (A1), nst. RGL Materiaux Avances, Nitrogen-containing metallophosphates, their preparatio and their use as catalysts or as catalysts supports, 1992, English Trans. specification, (12 pages).*
Massinon, A., et al., An example of novel basic catalysts: the aluminophosphate oxynitrides or AIPONs, 1996, Studies in surface science and catalysis, vol. 101, pp. 77-85.*
Hasni, M. et al., "Liquid phase aldol condensation of cyclopentanone with valeraldehyde catalysed by oxynitrides possessing tuneable acid-base properties," Journel of Molecular Catalysis. A: Chemical, Mar. 16, 2006, pp. 116-123, vol. 247, No. 1-2, Elsevier Science, Amsterdam, NL; Cited in Search Report, dated Feb. 8, 2011, issued in corresponding FR 1002327.
Delsarte, S. et al., "Butan-1-ol and butan-2-ol dehydration on nitrided aluminophosphates: influence of nitridation on reaction pathways," Applied Catalysis A: General, Mar. 15, 2004, pp. 269-279, vol. 259, No. 2, Elsevier Science, Amsterdam, NL; Cited in Search Report, dated Feb. 8, 2011, issued in corresponding FR 1002327.
Massinon, A., et al., "Influence of nitrogen content on the acid-base properties of aluminophosphate oxynitrides," Applied Catalysis A: General, Mar. 8, 1996, pp. 9-23, vol. 137, No. 1, Elsevier Science, Amsterdam, NL.; Cited in Search Report, dated Feb. 8, 2011, issued in corresponding FR 1002327.
Search Report, dated Feb. 8, 2011, issued in corresponding FR 1002327.

* cited by examiner

*Primary Examiner* — Yate K Cutliff
(74) *Attorney, Agent, or Firm* — Millen, White, Zelano & Branigan, P.C.

(57) ABSTRACT

A method of preparing a composition of alcohol esters of linear monocarboxylic acids with 6 to 26 carbon atoms from a vegetable or animal oil, neutral or acid, virgin or recycled, with monoalcohols having 1 to 18 carbon atoms, in the presence of a catalyst of nitrogen-containing metallophosphate type.

14 Claims, No Drawings

METHOD OF PREPARING ALCOHOL ESTERS FROM TRIGLYCERIDES AND ALCOHOLS USING HETEROGENEOUS CATALYSTS BASED ON NITROGEN-CONTAINING METALLOPHOSPHATES

FIELD OF THE INVENTION

The present invention relates to a method of preparing alcohol esters of monocarboxylic acids from fatty substances of vegetable or animal origin by means of a transesterification reaction.

BACKGROUND OF THE INVENTION

Fatty substance esters are currently used in many applications as diesel fuels, furnace fuel oils, ecological solvents, base compounds for preparing fatty alcohol sulfonates, amides, ester dimers, etc.

They can be obtained from a transesterification reaction carried out according to path I below and optionally a coupled esterification and transesterification reaction, esterification being achieved according to path II below.

Path I:
1 triglyceride+3 alcohols→3 fatty substance esters+glycerin

Path II:
Fatty acid+alcohol→fatty acid esters+water
Fatty acid+glycerin→glyceride+water In the case of diesel fuel, which is today a major application for fatty substance esters, a certain number of specifications have been established, whose list, limits and methods belong to standard EN 14214 (2003) currently applicable in Europe. The ester must contain at least 96.5 mass % esters, at most 0.8 mass % monoglycerides, at most 0.2 mass % diglycerides and at most 0.2 mass % triglycerides, few free fatty acids (<0.5 mg KOH per g), which may be corrosive, less than 0.25 mass % bonded and free glycerin, and metals only as traces. This requires a precise protocol in order to obtain the desired purity.

When preparing an ester from oil or fat and monoalcohol, depending on the nature of the oil initially used, 10 to 15 mass % of a secondary product, which is glycerin, automatically forms. This glycerin is sold at a high price for various uses, but only if it has high purity. This is obtained after deep purifications in specialized vacuum distillation units.

In short, most commercial ester preparation methods lead quite readily to raw products (esters and glycerin) that must however be deeply purified using various treatments that eventually burden the conversion cost.

It is well known to prepare methyl esters using conventional means such as homogeneous catalysis with soluble catalysts, like soda or sodium methylate, by reacting a neutral oil and an alcohol such as methanol (for example JAOCS 61, 343-348 (1984)). A pure product that can be used as fuel and a glycerin meeting specifications are however obtained only after many stages. Indeed, the glycerin obtained is polluted by alkaline salts or alcoholates, so that the glycerin purification facility is almost as costly as the ester production facility.

Heterogeneous catalysis methods afford the advantage of producing catalyst-free esters and glycerin that are therefore easily purified. It is however often difficult to economically obtain both an ester and a glycerin of high purity.

In order to improve the cost-effectiveness of this method and to limit its operating costs, many teams have taken an interest in the development of new and more active catalysts.

Basic solids have a high catalytic activity for the vegetable oil transesterification reaction, but they may be sensitive to the presence of free fatty acids contained in the feed. This problem can notably be encountered when the oils used in the method are economically interesting, such as, for example, jatropha oil or used oils. Various oxides and mixed oxides, possibly doped, have thus been tested, as described for example in the article by W. M. Antunes et al. (*Catalysis Today*, 133-135 (2008) 548-554), which describes the transesterification of soybean oil with methanol, using basic solid catalysts such as ZnO, MgO, $Al_2O_3$, or mixed oxides derived from hydrotalcites (Mg/Al and Zn/Mg/Al). However, these basic solids have a tendency to deactivate or they are not stable in the presence of too large an amount of fatty acids contained in unrefined or poorly refined oils.

Patent FR-B-2,752,242 filed in the name of the applicant describes the use of solid non-soluble catalysts formed from alumina and zinc oxide or zinc aluminate.

Using acid catalysts allows to work with feeds containing a certain proportion of free fatty acids, which are economically more interesting. An example thereof is the Fe-Zn cyanide solid used by P. Ratnasamy (*Applied Catal. A: Gen,* 314, 2006, 148) that allows transesterification of vegetable oils, acid or not, with yields close to those obtained with basic catalysts. However, the reaction selectivity, characterized by the formation of ethers, can be degraded by the presence on these solids of Brönsted acid sites bound to protons.

While trying to improve the performances of the transesterification reaction of fatty substances of vegetable or animal origin, the inventors have developed a method using an acido-basic heterogeneous catalyst based on nitrogen-containing metallophosphates having both basic and acid sites.

SUMMARY OF THE INVENTION

The method of preparing alcohol esters of monocarboxylic fatty acids according to the present invention uses a heterogeneous catalyst based on nitrogen-containing metallophosphates wherein the metals are selected from groups 4 and 13 of the periodic table.

DETAILED DESCRIPTION

The present invention describes a method of preparing a composition of alcohol esters of linear monocarboxylic acids with 6 to 26 carbon atoms and glycerin wherein a fatty substance of vegetable or animal origin is reacted with an aliphatic monoalcohol having 1 to 18 carbon atoms, in the presence of at least one acido-basic heterogeneous catalyst based on nitrogen-containing metallophosphates of general formula (I):

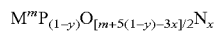

wherein:
M represents a metallic cation of at least one element selected from among the metals of groups 4 and 13 of the periodic table,
m represents the degree of oxidation of cation M,
$0 \leq y < 1$,
$0 < x \leq 2.67$,
x and y being such that $m+5(1-y)-3x \geq 0$.

The nitrogen-containing metallophosphate compounds comprising at least one metal selected from among groups 4 or 13 of the periodic table are acido-basic compounds having both basic sites, for example from the amino groups (—NH—, —$NH_2$) present at the surface thereof, and acid sites linked with the presence of metal. This duality confers interesting catalytic properties thereon.

One advantage of the invention using catalysts based on nitrogen-containing metallophosphates of at least one metal selected from among groups 4 or 13 of the periodic table is their capacity of catalyzing the transesterification of fatty substances with alcohols such as methanol or heavier than alcohols. Thus, it is possible to form ethyl, isopropyl or butyl esters that are of interest because the flow points of esters formed with ethyl, isopropyl or butyl alcohols are often lower than those of methyl esters, the gain being sometimes 10° C., which allows to initially use more saturated oils.

One advantage of the invention using a catalyst based on nitrogen-containing metallophosphates of at least one metal selected from among groups 4 or 13 of the periodic table is notably to allow a decrease in the reaction temperature, the contact time between the reactants or the alcohol/fatty substance ratio in relation to the prior art, while improving the conversion rate and maintaining a high ester selectivity.

Another advantage of the invention lies in the fact that these solids catalyze transesterification and esterification reactions according to a heterogeneous catalysis process. Thus, the catalyst is not consumed in the reaction and is not dissolved in the reaction medium. By remaining in the solid form, it is easily separated from the reaction medium without catalyst loss and without pollution of the reaction medium by dissolved species or catalyst residues.

The activity and the selectivity of this catalyst are not affected by the transesterification or esterification reaction: the catalyst is stable and recyclable under the experimental reaction conditions. This type of catalyst is compatible with use in a continuous industrial process, with a fixed bed for example, wherein the catalyst feed can be used for a very long time without any activity loss.

Preferably, the metallic cation M of the nitrogen-containing metallophosphate compound is aluminium or titanium.

When the metallic cation is aluminium, m is 3.

When the metallic cation is titanium, m is 4.

Among the nitrogen-containing metallophosphate compounds of general formula (I), those whose atomic ratio M/P is 1 are particularly interesting. Thus, the catalyst used in the method according to the present invention preferably meets the general formula (II) as follows:

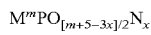

$$M^mPO_{[m+5-3x]/2}N_x$$

wherein:
M represents a metallic cation of at least one element selected among the metals of groups 4 and 13 of the periodic table,
m represents the degree of oxidation of cation M,
$0 < x \leq 2.67$,
and $m+5-3x \geq 0$.

More preferably, the heterogeneous catalyst used in the method is a nitrogen-containing aluminophosphate compound of formula (III):

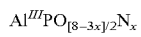

$$Al^{III}PO_{[8-3x]/2}N_x$$

wherein $0 < x \leq 2.67$.

The synthesis methods for these nitrogen-containing metallophosphate compounds are known from the prior art. They are notably described in publications by R. Conanec et al. (*High Temp. Chem. Processes*, 1, 1992, 157) and in patent FR-2,667,856. The various synthesis paths leading to these compounds are applicable within the context of the present invention and the preparation modes presented here are in no way restrictive.

The nitrogen-containing metallophosphates are obtained, in a non-limitative way, by means of a method characterized in that a precursor phosphate is reacted with ammonia at a temperature ranging between 600° C. and 1000° C.

When the atomic ratio M/P is 1, all the precursor phosphates meet formula MPO4,nH$_2$O where M is a cation from the metals of groups 4 or 13 and n is the number of associated water molecules, and n can optionally be zero.

This type of catalyst can advantageously be prepared by means of one of the methods described hereafter and known to the person skilled in the art. It is broken up into two stages: the first one consists in synthesizing the metallophosphate precursor MPO$_4$,nH$_2$O that is thereafter subjected to a nitriding stage in order to obtain the desired nitrogen-containing metallophosphate compound.

The metallophosphate precursor MPO$_4$,nH$_2$O can be obtained by reaction of a halogenide (MCl$_3$ if M is a metal of group 13) on the phosphoric acid in the presence of propylene oxide. The reaction takes place at 0° C., then the gel obtained at ambient temperature is washed with an alcohol solution. The solid is finally calcined so as to obtain the metallophosphate.

Nitriding of the phosphates involves the following reaction:

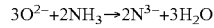

$$3O^{2-} + 2NH_3 \rightarrow 2N^{3-} + 3H_2O$$

The nitrogen substitutes for the oxygen of the network in a 2N/3O ratio while thus keeping the electric neutrality of the assembly. Nitriding in a tubular oven is carried out between 650° C. and 750° C. in an ammonia stream. For temperatures below 650° C., there is no reaction, and above 750° C., both substitution of the nitrogen for oxygen and departure of the phosphorus are observed.

Nitriding the metallophosphates allows, through selective modification of the surface acido-basic sites, to better adapt the compounds obtained to their use as catalysts that will have both acid sites, due to the presence of the metallic cation M, and basic sites linked with the presence of nitrogen in form of —NH— or —NH$_2$ groups.

The catalyst used in the method according to the present invention comes in form of powder, balls, extrudates or pellets.

One may consider using the catalyst based on nitrogen-containing metallophosphate in the presence of binders such as, by way of non-limitative example, alumina, silica or clays. Alumina, for example, notably allows to create a compound that is much more stable towards mechanical stresses.

The fatty substances used in the method according to the invention correspond to natural or elaborate substances, of animal or vegetable origin, predominantly containing triglycerides, commonly referred to as oil and fats.

Examples of oils that can be used are all the common oils, such as palm oil (concrete or olein), soybean oil, palm nut oil, copra oil, babassu oil, rapeseed oil (old or new), sunflower oil (conventional or oleic), corn oil, cotton oil, peanut oil, pourgher oil (*Jatropha curcas*), castor oil, linseed oil and crambe oil, and all the oils obtained from sunflower or rapeseed for example by genetic engineering or hybridization, or obtained from algae.

It is even possible to use waste kitchen oil, slaughterhouse oil, various animal oils such as fish oil, seal oil, tallow, lard, fat from sewage treatment and even fowl fat, because the esters manufactured from some alcohols such as ethyl, isopropyl or butyl alcohol allow to gain more than 10° C. in pour point and consequently to initially use more saturated oils.

The oils used can also include partly modified oils, for example by polymerization or oligomerization, such as for example linseed oil or sunflower oil "stand oils", and blown vegetable oils.

The oils used are neutral or acid, virgin or recycled oils.

The presence of fatty acids in the oils is not a priori harmful because catalytic systems based on nitrogen-containing phosphates of metals of groups III or IV, preferably aluminium or titanium, are also active for esterification and they also convert fatty acids to esters. The limit value for free fatty acids contained in the oils is an acid number close to 10 (the acid number being defined as the mass in mg of KOH required to titrate all the free fatty acids in 1 g oil). The operability of the method under such conditions is close to that defined with an oil having a low acid number (i.e. below 0.2 mg KOH/g).

In the case of oils with a very high acid number (close to 10 mg KOH/g), one option consists in preceding the transesterification reaction by an esterification reaction of the free fatty acids present, using either the same alcohol as the alcohol used in the transesterification method in the presence of a strong acid such as sulfuric acid or soluble or supported sulfonic acids (of Amberlyst 15® resins type), or using preferably glycerin, to form a total or partial glycerol ester, using the same catalyst based on phosphate oxynitride of metals of groups III or IV, preferably aluminium or titanium, at atmospheric pressure and preferably under vacuum, and at temperatures ranging between 150° C. and 220° C.

When using waste kitchen oils, which are a very cheap raw product for the production of a biodiesel fuel, the fatty acid polymers have to be removed from the reaction mixture so that the mixture of esters meets the specifications of the EN 14214 standard.

Alcohol

The nature of the alcohol used in the method plays a part in the transesterification activity.

In general terms, it is possible to use various aliphatic monoalcohols having for example 1 to 18 carbon atoms, preferably 1 to 12 carbon atoms.

More preferably, the aliphatic monoalcohol comprises 1 to 5 carbon atoms.

The most active one is methyl alcohol. However, ethyl alcohol and isopropyl, propyl, butyl, isobutyl and even amyl alcohols can be considered. Heavier alcohols such as ethylhexyl alcohol or lauric alcohol can also be used.

Methyl alcohol that facilitates the reaction can advantageously be added to the heavy alcohols.

Furthermore, when preparing the ethyl ester, it is possible to use a mixture of ethyl and methyl alcohol comprising 1 to 50 wt. %, preferably 1 to 10 wt. % methyl alcohol so as to increase the conversion.

Operating Conditions of the Transesterification Reaction

The method is carried out at temperatures ranging between 130° C. and 220° C., at pressures below 100 bars, with excess monoalcohol in relation to the fatty substance/alcohol stoichiometry.

The reaction can generally be operated according to various embodiments.

If the reaction is carried out in discontinuous mode, it can be conducted in one or two stages, i.e. by carrying out a first reaction up to 85% to 95% conversion to esters, cooling by evaporating the excess alcohol, decanting the glycerin and ending the reaction by heating again to between 130° C. and 220° C. and by adding alcohol to obtain total conversion.

A 98% conversion to esters can also be aimed by working for a sufficiently long time in a single stage under suitable conditions, for example by increasing the temperature and/or the alcohol/fatty substance ratio.

If the reaction is carried out in continuous mode, it can be conducted with several autoclaves and decanters. A partial conversion is performed in a first reactor, most often below 90%, generally approximately 85%, then decanting is achieved by evaporating the alcohol and by cooling; the transesterification reaction is completed in a second reactor under the aforementioned conditions by adding part of the alcohol previously evaporated. The excess alcohol is finally evaporated in an evaporator, and the glycerin and the esters are separated by decantation.

Thus, after these two stages, a biodiesel fuel meeting the specifications is obtained. The conversion level is adjusted so as to obtain an ester fuel meeting the specifications and a glycerin of high purity, by operating in one or two stages.

When selecting a fixed-bed continuous method, it can be advantageous to work at temperatures ranging between 130° C. and 220° C., preferably between 150° C. and 180° C., at pressures ranging between 10 and 70 bars, the LHSV preferably ranging between 0.1 and 3, more preferably between 0.3 and 2, in the first stage, and the alcohol/oil weight ratio ranging between 3/1 and 0.1/1.

Alcohol introduction can be advantageously fractionated. It can be fed into the tubular reactor at two levels as follows: supplying the reactor with the oil and about ⅔ of the alcohol involved, then supplying the rest of the alcohol approximately at the level of the upper third of the catalytic bed.

The leaching strength is verified in the present invention by the absence of traces from the catalyst, in the ester formed as well as in the glycerin produced.

The catalyst recyclability is experimentally evaluated over time.

If a temperature of 220° C. is not exceeded, an ester of same colour as the initial oil and a colourless glycerin are generally obtained after decantation.

Analysis of the compounds produced is performed either by gas chromatography for the esters and the glycerin or, more rapidly, by steric exclusion liquid chromatography for the esters.

The ester and the glycerol obtained contain no impurities from the catalyst. No purification treatment is therefore applied to eliminate the catalyst or residues thereof, unlike catalysts working according to a homogeneous process wherein the catalyst or its residues are, after the reaction, located in the same phase as the ester and/or the glycerin.

The ester fuel obtained has a monoglyceride content of at most 0.8 mass %, a diglyceride content of at most 0.2 mass %, a triglyceride content of at most 0.2 mass % and a glycerin content of less than 0.25 mass %.

By means of this type of process, the final purification is reduced to a minimum while allowing to obtain an ester meeting the fuel specifications and a glycerin whose purity ranges between 95% and 99.9%, preferably between 98% and 99.9%.

EXAMPLES

The following examples illustrate the invention without limiting the scope thereof, Examples 7 and 8 being given by way of comparison.

All the examples below were carried out in a closed reactor and they therefore correspond to a single stage. To obtain a biodiesel fuel meeting the specifications, it would be necessary to perform, at the end of this first stage, decantation by evaporating the alcohol and by cooling, then to complete the transesterification reaction by adding the evaporated alcohol part.

The oil used in these examples is rapeseed oil whose fatty acid composition is as follows:

TABLE 1

| Rapeseed oil composition | | |
|---|---|---|
| Fatty acid glyceride | Nature of the fatty chain | Mass % |
| Palmitic | C16:0 | 5 |
| Palmitoleic | C16:1 | <0.5 |
| Stearic | C18:0 | 2 |
| Oleic | C18:1 | 59 |
| Linoleic | C18:2 | 21 |
| Linolenic | C18:3 | 9 |
| Arachidic | C20:0 | <0.5 |
| Gadoleic | C20:1 | 1 |
| Behenic | C22:0 | <0.5 |
| Erucic | C22:1 | <1 |

However, any other oil of vegetable or animal origin could give similar results.

Example 1

$AlPO_4$ Synthesis

This example illustrates the preparation of $AlPO_4$ through hydrogel.

An equimolecular mixture of hexahydrated aluminium chloride $AlCl_3, 6H_2O$ and of phosphoric acid $H_3PO_4$ is first prepared in an ice bath. Propylene oxide ($T_B=35°$ C.) is then added under strong stirring in small fractions until addition of 3 moles to one mole of Al. The mixture is then left to rest at ambient temperature until formation of a thick gel that is washed with isopropanol, then dried and calcined at 650° C. The reaction equation is as follows:

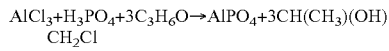

$$AlCl_3 + H_3PO_4 + 3C_3H_6O \rightarrow AlPO_4 + 3CH(CH_3)(OH)CH_2Cl$$

The aluminium phosphates thus prepared have specific surface areas of the order of 250 m²/g. The state of great division is accompanied by a very marked hygroscopic character. Left in ambient air, the powder can take up within some days up to 20% water. All the products obtained are white X-ray amorphous powders. A crystallization start can be obtained only after prolonged heating at high temperature, at 1000° C., where the tridymite variety is observed.

Example 2

Synthesis of Nitrogen-Containing Aluminophosphate Powders "AlPON"

The $AlPO_4$ powders were heated in a tubular oven in an ammonia stream. The oxynitrides formed are white and X-ray amorphous. The corresponding specific surface area measurement reaches values close to 240 m²/g. It is interesting to observe that high specific surface areas are kept after the thermal nitriding treatment. The products still have a hygroscopic character, although less marked than the initial phosphates (approximately 10% water uptake). The experimental conditions are given in the table below:

| Product | Temp. | Mass % nitrogen | Mass % oxygen | Formulation | Specific surface area |
|---|---|---|---|---|---|
| 1 | 800° C. | 6.7 | 40.2 | $AlPO_{3.1}N_{0.6}$ | 245 m²/g |
| 2 | 800° C. | 8.7 | 39.1 | $AlPO_{2.9}N_{0.7}$ | 233 m²/g |

Example 3

Transesterification of Vegetable Oils (Rapeseed Oil) by Methanol from an AlPON Solid Catalyst with a 6.7% Nitrogen Content, at 180° C.

25 grapeseed oil, 25 g methanol and 0.5 g catalyst (Example 2, compound 1) in powder form are fed into a closed reactor at ambient temperature. The methanol/oil mass ratio is thus 1, which corresponds to a molar ratio of 27.5. The reactor is then closed, stirred (200 rpm) and heated to 180° C. by means of a heating magnetic stirrer. The temperature of the reaction medium is stabilized at 180° C. after 20 minutes heating. The pressure is the autogenous pressure of alcohol at the operating temperature. The reaction is monitored as soon as the temperature of the reaction medium has reached the set temperature value. Samples are regularly taken in order to follow the progress of the reaction. After 6 hours' reaction, stirring is stopped and the reactor is left to cool down to ambient temperature. The samples taken and the final effluent are washed by means of a NaCl-saturated aqueous solution then, after decantation, the upper organic phase is analysed by gel-permeation chromatography (GPC). The table hereafter shows the results obtained.

| | | Sampling (in h) | | | |
|---|---|---|---|---|---|
| | | 0[b] | 2 | 4 | 6 |
| Mass % in the organic phase[a] | Triglycerides | 76 | 32 | 20 | 13 |
| | Diglycerides[c] | 12 | 10 | 7 | 6 |
| | Monoglyceride | 1 | 6 | 7 | 10 |
| | Vegetable oil methyl esters | 11 | 52 | 66 | 71 |

[a]determined by GPC
[b]t = 0 when the reaction medium is at temperature
[c]% representing the diglycerides and sterols Conversion of the triglycerides starts while the reaction medium has not reached 180° C. (11% esters at t0). The conversion (estimated in relation to the triglycerides, conversion=$1-m_{final}$(triglycerides)/$m_{initial}$(triglycerides)), is 87% in 6 h.

Leaching of the catalyst in the ester and glycerin phase is negligible (the phosphorus and aluminium content estimated by means of the inductively coupled plasma (ICP) technique is below 10 ppm). The ether content in the glycerin is low (<0.1%), which confers high purity thereon.

Example 4

Transesterification of Vegetable Oils (Rapeseed Oil) by Methanol from an AlPON Solid catalyst with a 8.7% Nitrogen Content (Catalyst of Example 2, Compound 2), at 180° C.

25 grapeseed oil, 25 g methanol and 0.5 g catalyst in powder form are fed into a closed reactor at ambient temperature. The methanol/oil mass ratio is thus 1, which corresponds to a molar ratio of 27.5. The reactor is then closed, stirred (200 rpm) and heated to 180° C. by means of a heating magnetic stirrer. The temperature of the reaction medium is stabilized at 180° C. after 20 minutes heating. The pressure is the autogenous pressure of alcohol at the operating temperature. The reaction is monitored as soon as the temperature of the reaction medium has reached the set temperature value. Samples are regularly taken in order to follow the progress of the reaction. After 6 hours' reaction, stirring is stopped and the reactor is left to cool down to ambient temperature. The samples taken and the final effluent are washed by means of a NaCl-saturated aqueous solution then, after decantation, the upper organic phase is analysed by gel-permeation chromatography (GPC). The table hereafter shows the results obtained.

|  |  | Sampling (in h) | | | |
|---|---|---|---|---|---|
|  |  | $0^b$ | 2 | 4 | 6 |
| Mass % in the organic phase$^a$ | Triglycerides | 79 | 43 | 29 | 20 |
|  | Diglycerides$^c$ | 11 | 16 | 12 | 9 |
|  | Monoglyceride | 2 | 5 | 5 | 6 |
|  | Vegetable oil methyl esters | 8 | 36 | 54 | 65 |

$^a$determined by GPC
$^b$t = 0 when the reaction medium is at temperature
$^c$% representing the diglycerides and sterols Conversion of the triglycerides starts while the reaction medium has not reached 180° C. (8% esters at t0). The conversion (estimated in relation to the triglycerides, conversion=$1-m_{final}$(triglycerides)/$m_{initial}$(triglycerides)), is 80% in 6 h.

Leaching of the catalyst in the ester and glycerin phase is negligible (the phosphorus and aluminium content estimated by means of the inductively coupled plasma (ICP) technique is below 10 ppm). The ether content in the glycerin is low (<0.1%), which confers high purity thereon.

Example 5

Transesterification of Vegetable Oils (Rapeseed Oil) by Ethanol from an AlPON Solid Catalyst with a 6.7% Nitrogen Content (Catalyst of Example 2, Product 1), at 180° C.

2l grapeseed oil, 30 g ethanol and 0.5 g catalyst in powder form are fed into a closed reactor at ambient temperature. The methanol/oil mass ratio is thus 1, which corresponds to a molar ratio of 27.5. The reactor is then closed, stirred (200 rpm) and heated to 180° C. by means of a heating magnetic stirrer. The temperature of the reaction medium is stabilized at 180° C. after 20 minutes heating. The pressure is the autogenous pressure of alcohol at the operating temperature. The reaction is monitored as soon as the temperature of the reaction medium has reached the set temperature value. Samples are regularly taken in order to follow the progress of the reaction. After 6 hours' reaction, stirring is stopped and the reactor is left to cool down to ambient temperature. The samples taken and the final effluent are washed by means of a NaCl-saturated aqueous solution then, after decantation, the upper organic phase is analysed by gel-permeation chromatography (GPC). The table hereafter shows the results obtained.

|  |  | Sampling (in h) | | | |
|---|---|---|---|---|---|
|  |  | $0^b$ | 2 | 4 | 6 |
| Mass % in the organic phase$^a$ | Triglycerides | 87 | 44 | 30 | 22 |
|  | Diglycerides$^c$ | 8 | 15 | 13 | 10 |
|  | Monoglyceride | 0 | 6 | 6 | 7 |
|  | Vegetable oil methyl esters | 5 | 35 | 51 | 61 |

$^a$determined by GPC
$^b$t = 0 when the reaction medium is at temperature
$^c$% representing the diglycerides and sterols Conversion of the triglycerides starts while the reaction medium has not reached 180° C. (5% esters at t0). The conversion (estimated in relation to the triglycerides, conversion=$1-m_{final}$(triglycerides)/$m_{initial}$(triglycerides)), is 78% in 6 h.

Leaching of the catalyst in the ester and glycerin phase is negligible (the phosphorus and aluminium content estimated by means of the inductively coupled plasma (ICP) technique is below 10 ppm). The ether content in the glycerin is low (<0.1%), which confers high purity thereon.

Example 6

Transesterification of Vegetable Oils (Rapeseed Oil) by Ethanol from an AlPON Solid Catalyst with a 8.7% Nitrogen Content (Catalyst of Example 2, Product 2), at 180° C.

2l grapeseed oil, 30 g ethanol and 0.5 g catalyst in powder form are fed into a closed reactor at ambient temperature. The methanol/oil mass ratio is thus 1, which corresponds to a molar ratio of 27.5. The reactor is then closed, stirred (200 rpm) and heated to 180° C. by means of a heating magnetic stirrer. The temperature of the reaction medium is stabilized at 180° C. after 20 minutes heating. The pressure is the autogenous pressure of alcohol at the operating temperature. The reaction is monitored as soon as the temperature of the reaction medium has reached the set temperature value. Samples are regularly taken in order to follow the progress of the reaction. After 6 hours' reaction, stirring is stopped and the reactor is left to cool down to ambient temperature. The samples taken and the final effluent are washed by means of a NaCl-saturated aqueous solution then, after decantation, the upper organic phase is analysed by gel-permeation chromatography (GPC). The table hereafter shows the results obtained.

|  |  | Sampling (in h) | | | |
|---|---|---|---|---|---|
|  |  | $0^b$ | 2 | 4 | 6 |
| Mass % in the organic phase$^a$ | Triglycerides | 92 | 52 | 38 | 32 |
|  | Diglycerides$^c$ | 5 | 18 | 16 | 14 |
|  | Monoglyceride | 0 | 5 | 6 | 5 |
|  | Vegetable oil methyl esters | 2 | 25 | 40 | 49 |

$^a$determined by GPC
$^b$t = 0 when the reaction medium is at temperature
$^c$% representing the diglycerides and sterols Conversion of the triglycerides starts while the reaction medium has not reached 180° C. (2% esters at t0). The conversion (estimated in relation to the triglycerides, conversion=$1-m_{final}$(triglycerides)/$m_{initial}$(triglycerides)), is 68% in 6 h.

Leaching of the catalyst in the ester and glycerin phase is negligible (the phosphorus and aluminium content estimated by means of the inductively coupled plasma (ICP) technique is below 10 ppm). The ether content in the glycerin is low (<0.1%), which confers high purity thereon.

Example 7 (Comparative)

Transesterification of Rapeseed Oil by Methanol in the Presence of Zinc Aluminate ($ZnAl_2O_4$) in Powder Form at 180° C.

25 g rapeseed oil, 25 g methanol and 0.5 g catalyst in powder form are fed into a closed reactor at ambient temperature. The methanol/oil mass ratio is thus 1, which corresponds to a molar ratio of 27.5. The reactor is then closed, stirred (200 rpm) and heated to 180° C. by means of a heating magnetic stirrer. The temperature of the reaction medium is stabilized at 180° C. after 20 minutes heating. The pressure is the autogenous pressure of alcohol at the operating temperature. The reaction is monitored as soon as the temperature of the reaction medium has reached the set temperature value. Samples are regularly taken in order to follow the progress of the reaction. After 6 hours' reaction, stirring is stopped and the reactor is left to cool down to ambient temperature. The samples taken and the final effluent are washed by means of a NaCl-saturated aqueous solution then, after decantation, the upper organic phase is analysed by gel-permeation chromatography (GPC). The table hereafter shows the results obtained.

|  |  | Sampling (in h) | | |
|--|--|--|--|--|
|  |  | 0[b] | 4 | 6 |
| Mass % in the organic phase[a] | Triglycerides | 92 | 44 | 29 |
|  | Diglycerides[c] | 5 | 20 | 18 |
|  | Monoglyceride | 0 | 7 | 9 |
|  | Vegetable oil methyl esters | 3 | 29 | 44 |

[a]determined by GPC
[b]t = 0 when the reaction medium is at temperature
[c]% representing the diglycerides and sterols This example clearly shows that zinc aluminate catalyzes the transesterification reaction much more slowly than a nitrogen-containing metallophosphate since, in 6 h, only 44% esters are obtained instead of 71% for the nitrogen-containing metallo-phosphate containing 6.7% nitrogen.

Example 8 (Comparative)

Transesterification of Rapeseed Oil by Ethanol in the Presence of Zinc Aluminate (ZnAl$_2$O$_4$) in Powder Form at 200° C.

21 g rapeseed oil, 30 g ethanol and 0.5 g catalyst in powder form are fed into a closed reactor at ambient temperature. The methanol/oil mass ratio is thus 1, which corresponds to a molar ratio of 27.5. The reactor is then closed, stirred (200 rpm) and heated to 200° C. by means of a heating magnetic stirrer. The temperature of the reaction medium is stabilized at 200° C. after 30 minutes heating. The pressure is the autogenous pressure of alcohol at the operating temperature. The reaction is monitored as soon as the temperature of the reaction medium has reached the set temperature value. Samples are regularly taken in order to follow the progress of the reaction. After 6 hours' reaction, stirring is stopped and the reactor is left to cool down to ambient temperature. The samples taken and the final effluent are washed by means of a NaCl-saturated aqueous solution then, after decantation, the upper organic phase is analysed by gel-permeation chromatography (GPC). The table hereafter shows the results obtained.

|  |  | Sampling (in h) | | |
|--|--|--|--|--|
|  |  | 0[b] | 4 | 6 |
| Mass % in the organic phase[a] | Triglycerides | 97 | 56 | 36 |
|  | Diglycerides[c] | 1 | 21 | 22 |
|  | Monoglyceride | 0 | 4 | 9 |
|  | Vegetable oil methyl esters | 2 | 18 | 33 |

[a]determined by GPC
[b]t = 0 when the reaction medium is at temperature
[c]% representing the diglycerides and sterols This example clearly shows that zinc aluminate catalyzes the transesterification reaction with ethanol much more slowly than a nitrogen-containing metallophosphate since, in 6 h, only 33% esters are obtained, at 200° C., instead of 61% for the nitrogen-containing metallophosphate containing 6.7% nitrogen, although with a reaction conducted at a lower temperature, at 180° C.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 10/02.327, filed Jun. 2, 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of preparing a composition of alcohol esters of linear monocarboxylic acids with 6 to 26 carbon atoms and glycerin, wherein a vegetable oil that is neutral, acid, virgin or recycled or an animal oil that is neutral acid, virgin or recycled, is reacted with an aliphatic monoalcohol having 1 to 18 carbon atoms, in the presence of an acido-basic heterogeneous catalyst based on nitrogen-containing metallophosphates of formula (I):

$$M^m P_{(1-y)} O_{[m+5(1-y)-3x]/2} N_x$$

wherein:
M represents a metallic cation that is a metal of group or 13 of the periodic table,
m represents the degree of oxidation of cation M
$0 \leq y < 1$
$0 < x \leq 2.67$
x and y being such that $m+5(1-y)-3x \geq 0$.

2. A method as claimed in claim 1, wherein said heterogeneous catalyst is a catalyst of formula (II):

$$M^m PO_{[m+5-3x]/2} N_x$$

wherein:
M represents a metallic cation of at least one element comprising a metal of group 4 or 13 of the periodic table, m represents the degree of oxidation of cation M,
$0<x\leq2.67$
and $m+5-3x\geq0$.

3. A method as claimed in claim 1 wherein the metallic cation is aluminium or titanium.

4. A method as claimed in claim 1, wherein the catalyst is a nitrogen-containing aluminophosphate compound of formula (III):

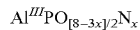

wherein $0<x\leq2.67$.

5. A method as claimed in claim 1, wherein the fatty substance of animal or vegetable origin is concrete palm oil or olein, soybean oil, palm nut oil, copra oil, babassu oil, old or new rapeseed oil, conventional or oleic sunflower oil corn oil, cotton oil, peanut oil, pourgher oil (*Jatropha curcas*), castor oil, linseed oil, crambe oil, an oil obtained from sunflower or rapeseed, an oil obtained by genetic engineering or hybridization, an oil obtained from algae or microalgae, waste kitchen oil, fish oil, seal oil, tallow, lard, fat from sewage treatment or fowl fat.

6. A method as claimed in claim 1, wherein said aliphatic monoalcohol comprises 1 to 12 carbon atoms.

7. A method as claimed in claim 1, carried out at a temperature ranging between 130° C. and 220° C., at a pressure below 100 bars and with excess monoalcohol in relation to the fatty substance/alcohol stoichiometry.

8. A method as claimed in claim 1, wherein the reaction is carried out in discontinuous mode.

9. A method as claimed in claim 1, wherein the reaction is carried out in continuous mode, in a fixed bed or with autoclaves and decanters arranged in series.

10. A method as claimed in claim 9, wherein the reaction is carried out in a fixed bed, at a pressure ranging between 1 and 7 MPa, at an LHSV ranging between 0.1 and 3, in the first stage, and the alcohol/oil weight ratio ranging between 3/1 and 0.1/1.

11. A method as claimed in claim 1, carried out in two stages by adjusting the conversion level so as to obtain an ester fuel having a monoglyceride content of at most 0.8 mass %, a diglyceride content of at most 0.2 mass %, a triglyceride content of at most 0.2 mass %, a glycerin content of less than 0.25 mass %, and a glycerin of purity ranging between 95% and 99.9%.

12. A method according to claim 6, wherein said aliphatic monoalcohol comprises 1 to 5 carbon atoms.

13. A method according to claim 10, wherein the reaction is carried out at an LHSV ranging between 0.3 and 2.

14. A method according to claim 11, said glycerin purity is between 98% and 99.9%.

* * * * *